(12) United States Patent
Bønding et al.

(10) Patent No.: US 10,151,298 B2
(45) Date of Patent: Dec. 11, 2018

(54) SYSTEM FOR DYNAMIC PITCH CONTROL

(71) Applicant: Mitra-Teknik A/S, Rødkærsbro (DK)

(72) Inventors: Jesper Bønding, Suldrup (DK); Søren Dalsgaard, Hadsten (DK)

(73) Assignee: Mita-Teknik A/S, Rødkærsbro (DK)

( * ) Notice: Subject to any disclaimer, the term of this patent is extended or adjusted under 35 U.S.C. 154(b) by 0 days.

(21) Appl. No.: 15/319,829

(22) PCT Filed: Jun. 8, 2015

(86) PCT No.: PCT/DK2015/050148
§ 371 (c)(1),
(2) Date: Dec. 19, 2016

(87) PCT Pub. No.: WO2015/192852
PCT Pub. Date: Dec. 23, 2015

(65) Prior Publication Data
US 2017/0138348 A1    May 18, 2017

(30) Foreign Application Priority Data

Jun. 20, 2014 (DK) .................................. 2014 70372

(51) Int. Cl.
*G05D 3/12* (2006.01)
*G05D 5/00* (2006.01)
(Continued)

(52) U.S. Cl.
CPC ........... *F03D 7/0224* (2013.01); *F03D 7/024* (2013.01); *F03D 7/043* (2013.01);
(Continued)

(58) Field of Classification Search
CPC ........................ F05B 2260/74; Y02E 10/723
(Continued)

(56) References Cited

U.S. PATENT DOCUMENTS

2006/0145483 A1* 7/2006 Larsen ................... F03D 7/022
                                                    290/44
2010/0014969 A1    1/2010 Wilson
(Continued)

FOREIGN PATENT DOCUMENTS

CN    102926930 A    2/2013
CN    103306900 A    9/2013
(Continued)

*Primary Examiner* — Mohammad Ali
*Assistant Examiner* — Md Azad
(74) *Attorney, Agent, or Firm* — James Creighton Wray; Meera P. Narasimhan

(57) ABSTRACT

The present invention relates to a system for dynamic pitch control primarily for wind turbine blades, which system calculates the pitch position of the wind turbine blades independently, which control system performs feedback regulation. The object of the pending patent application is to perform effective pitch regulation and hereby to reduce thrust on the tower and the rotor. This can be achieved if the system performs feed forward regulation of the pitch of the blades, based on the load of the previous blade in substantially the same position. Hereby it can be achieved that the actual load on the previous blade has passed the same position in relation to the wind blowing around the wind turbine. Hereby it can be achieved that measured parameters are used after a short delay to perform a very precise and highly efficient adjustment of the next wind turbine blade passing the same position. The feed forward regulation can be combined with already existing control parameters for pitch control of wind turbine blades.

8 Claims, 2 Drawing Sheets

(51) Int. Cl.
  *G05D 9/00* (2006.01)
  *G05D 11/00* (2006.01)
  *G05D 17/00* (2006.01)
  *F03D 7/02* (2006.01)
  *F03D 7/04* (2006.01)
(52) U.S. Cl.
  CPC ..... *F05B 2260/74* (2013.01); *F05B 2260/821* (2013.01); *F05B 2270/1095* (2013.01); *F05B 2270/326* (2013.01); *F05B 2270/327* (2013.01); *F05B 2270/328* (2013.01); *F05B 2270/331* (2013.01); *F05B 2270/335* (2013.01); *F05B 2270/404* (2013.01); *Y02E 10/723* (2013.01)
(58) Field of Classification Search
  USPC .......................................................... 700/287
  See application file for complete search history.

(56) References Cited

U.S. PATENT DOCUMENTS

| | | | | |
|---|---|---|---|---|
| 2010/0014971 | A1* | 1/2010 | Risager | F03D 7/0224 416/1 |
| 2012/0104757 | A1* | 5/2012 | Carbonell et al. | F03D 7/0224 290/44 |
| 2012/0133134 | A1 | 5/2012 | Scholte-Wassnik | |
| 2012/0183399 | A1* | 7/2012 | Perkinson | F03D 7/0224 416/1 |
| 2014/0178197 | A1* | 6/2014 | Risager | F03D 7/0224 416/1 |
| 2015/0292483 | A1* | 10/2015 | Slack | F03D 7/0276 290/44 |
| 2015/0337802 | A1* | 11/2015 | Su | F03D 7/0224 416/1 |
| 2017/0022972 | A1* | 1/2017 | Kjr | F03D 7/0224 |

FOREIGN PATENT DOCUMENTS

| | | |
|---|---|---|
| CN | 103384764 A | 11/2013 |
| DE | 102010027229 A1 | 1/2012 |
| EP | 2607689 A2 | 6/2012 |
| WO | 2007104306 A1 | 9/2007 |
| WO | 2008041066 A1 | 4/2008 |
| WO | 2009059606 A2 | 5/2009 |
| WO | 2009071882 A2 | 6/2009 |
| WO | 2012007111 A2 | 1/2012 |
| WO | 2012083958 A2 | 6/2012 |
| WO | 2013182204 A1 | 12/2013 |

* cited by examiner

SYSTEM FOR DYNAMIC PITCH CONTROL

This application claims the benefit of Danish Application No. PA 0214 70372 filed Jun. 20, 2014, and PCT/DK2015/050148 filed Jun. 8, 2015, International Publication No. WO 2015/192852, which are hereby incorporated by reference in their entirety as if fully set forth herein.

FIELD OF THE INVENTION

The present invention relates to a system for dynamic pitch control primarily for wind turbine blades, which system calculates the pitch position of the wind turbine blades independently, which control system performs feedback regulation based on at least some of the following input parameters: tilt/yaw-based individual pitch control (IPC) algorithm, pitch offset, load level for each blade, load level for tower, power production and rotor speed.

BACKGROUND OF THE INVENTION

WO 2013/182204 discloses a method of operating a wind turbine. The wind turbine comprises a turbine rotor with at least two blades, each blade having a variable pitch angle. The method comprises determining mechanical loads on the blades, determining an asymmetric load moment experienced by the turbine rotor based on the mechanical loads on the blades, determining high order harmonics from the asymmetric load moment, and determining an individual pitch control signal for each of the blades for varying the pitch angle of each blade to compensate for the asymmetric load moment. The individual pitch control signal for each blade is determined at least based on the high order harmonics.

OBJECT OF THE INVENTION

The object of the present invention is to perform effective pitch regulation and hereby to reduce thrust on the tower and the rotor. A further object of the invention is to increase the power production of a wind turbine.

DESCRIPTION OF THE INVENTION

This can be achieved if the system performs feed forward regulation of the pitch of the blades, based on the load on the previous blades in substantially the same position. Hereby it can be achieved that the actual load on the previous blades has passed the same position in relation to the wind blowing around the wind turbine. Hereby it can be achieved that measured parameters are used after a short delay to perform a very precise and highly efficient adjustment of the next wind turbine blade passing the same position. The feed forward regulation can be combined with already existing control parameters for pitch control of wind turbines. Hereby other parameters can be used that represent the actual operational situation of the wind turbine which still has an effect on the regulation of each of the blades. All common regulation by the wind turbine control system can still have high priority combined with the feed forward regulation.

In a preferred embodiment of the invention the feed forward algorithm can use the resulting pitch demand from the preceding blade. Hereby can be achieved, that its demand as well as its actual load can be used as parameters for the feed forward regulation.

In a further preferred embodiment of the invention, the feed forward algorithm can use variable delay to match rotor azimuth position and pitch actuator dynamics. Herby can be achieved that feed forward regulation will be correctly time-delayed, depending on the different rotor velocities which are used in modern wind turbines in order to utilise the highest yield in the given wind situation.

In a further preferred embodiment of the invention, the feed forward algorithm can use a scaling factor to reduce the feed forward signal. By using a scaling factor it is achieved that also traditional pitch regulation such as common pitch regulation and regulation of power production or external power regulations still have influence on the pitch regulation in the feed forward activity.

In a further preferred embodiment of the invention, the pitch servo can receive input from at least a collective pitch control system, an IPC system, and a cyclic pitch control system for feed forward regulation. In this way, existing feedback signals can be combined with the feed forward regulation as previously disclosed.

The invention further disclose a method for dynamic pitch control as disclosed previously and modified in the following steps of operation, a. input actual load level on each blade to the system, b. input power production of the wind turbine to the system c. input rotor speed to the system d. perform regulation based on the input and performs feed forward regulation of the pitch of the wind turbine blades, e. based on the load at an actual blade and at the previous blade in relation to the angular velocity of the rotor perform dynamic pitch regulation of the actual blade.

Hereby can be achieved pitch regulation based of a traditional feedback regulation modified by a feed forward regulation.

The controller feature will superimpose a pitch reference on top of the existing pitch reference. This additional pitch reference will be based on the blade load signal from each individual blade, and not on the resulting tilt/yaw moments which is the case for existing controllers. This control algorithm will be referred to as 'individual pitch control feed forward' or 'IPC feed forward'.

The existing individual pitch control (IPC) algorithm applied to a wind turbine is in the form of cyclic pitch control to control static tilt/yaw loading using a sinusoid on the pitch reference. Content in the estimated tilt/yaw loading is removed by filtering to avoid reaction on tower shadow effects. This is a well-proven algorithm for handling static tilt/yaw and the resulting blade fatigue. To a large extent, this will also reduce extreme loads on blades because of the shear compensation. For large rotors, it is a different phenomenon that drives some of the extreme blade loads.

A representative plot of this phenomenon can be shown where the blade load and tilt load behaviour are plotted around the extreme blade load event. Near the extreme blade load, the tilt is exposed to a resonance which builds up t=90-100 s and dies out near t=115 s. In this period, several near-to-extreme blade load peaks occur. As indicated in the blade load signals, the mean across the three blades is not at a severe level; hence the thrust limiter will not react or react only slightly.

The conceptual idea of this individual pitch control algorithm is to augment the tilt/yaw-based IPC algorithm with a pitch offset based on the present load level for each blade (feedback control). As a natural extension to this idea, the pitch behaviour of the preceding blade will be fed into the load control and the feed forward control.

The control concept is an individual pitch control algorithm. Below there is a short description of the algorithm for one of the blades (same algorithm exists for each blade).

The IPC feed forward algorithm calculates a pitch demand which will be augmented to the cyclic tilt/yaw pitch demand. This pitch demand is a sum of a feedback part and a feed forward part.

Feedback Part

Blade load measurement is passed through a high-pass filter to remove the mean load level which is typically unreliable. A lead compensator is added to increase controller reaction to high dynamic signals. In addition to this, the lead compensator gain is scheduled on blade load level to limit the pitch activity.

Feed Forward Part

The feed forward algorithm uses the resulting pitch demand from the preceding blade with a scaling factor, variably delayed to match rotor azimuth position and pitch actuator dynamics.

DETAILED DESCRIPTION OF THE INVENTION

Figure 1:
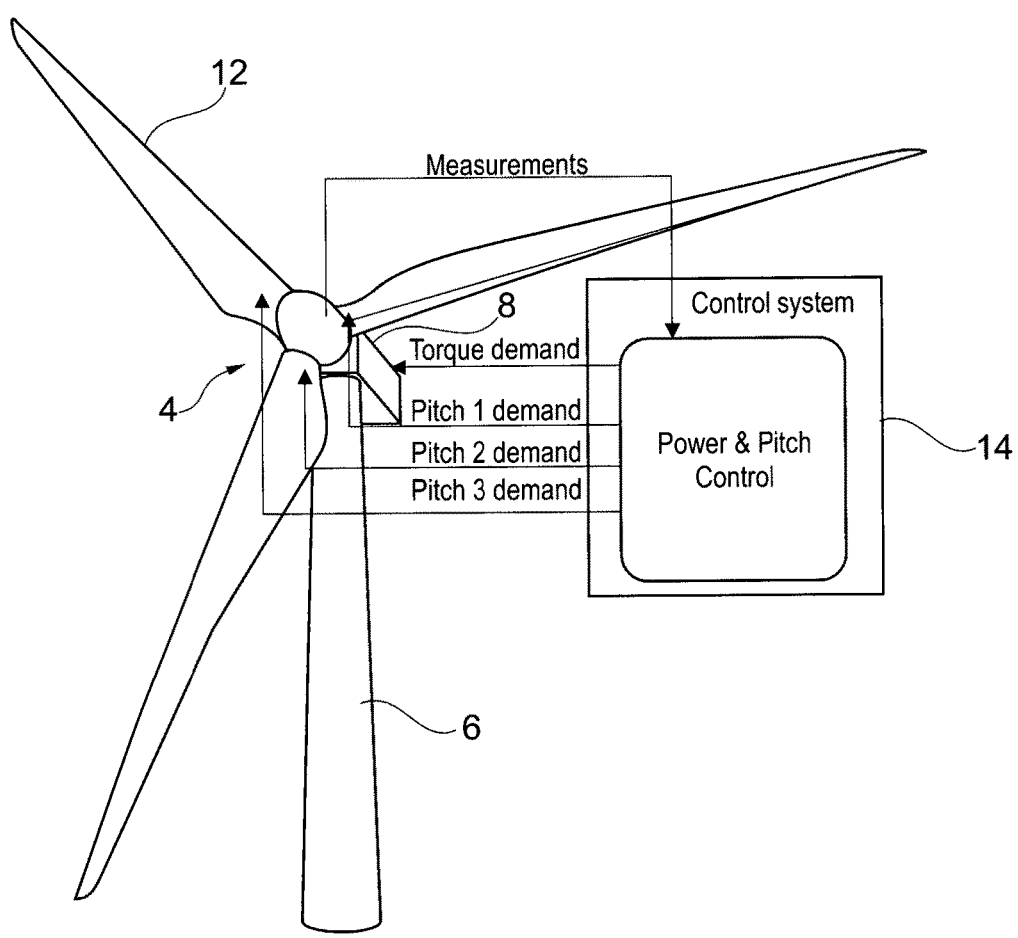
FIG. 1 shows a wind turbine.

FIG. 1 shows a wind turbine 4 comprising a tower 6, a nacelle 8, and a rotor with blades 12. Further, a power and pitch control system 14 are indicated.

By the present invention it is possible to reduce the maximum thrust, both at the tower 6 and at the blades 12. The advantage of the present invention is that this reduction of thrust can be performed, and maybe the power production can be increased.

Figure 2:
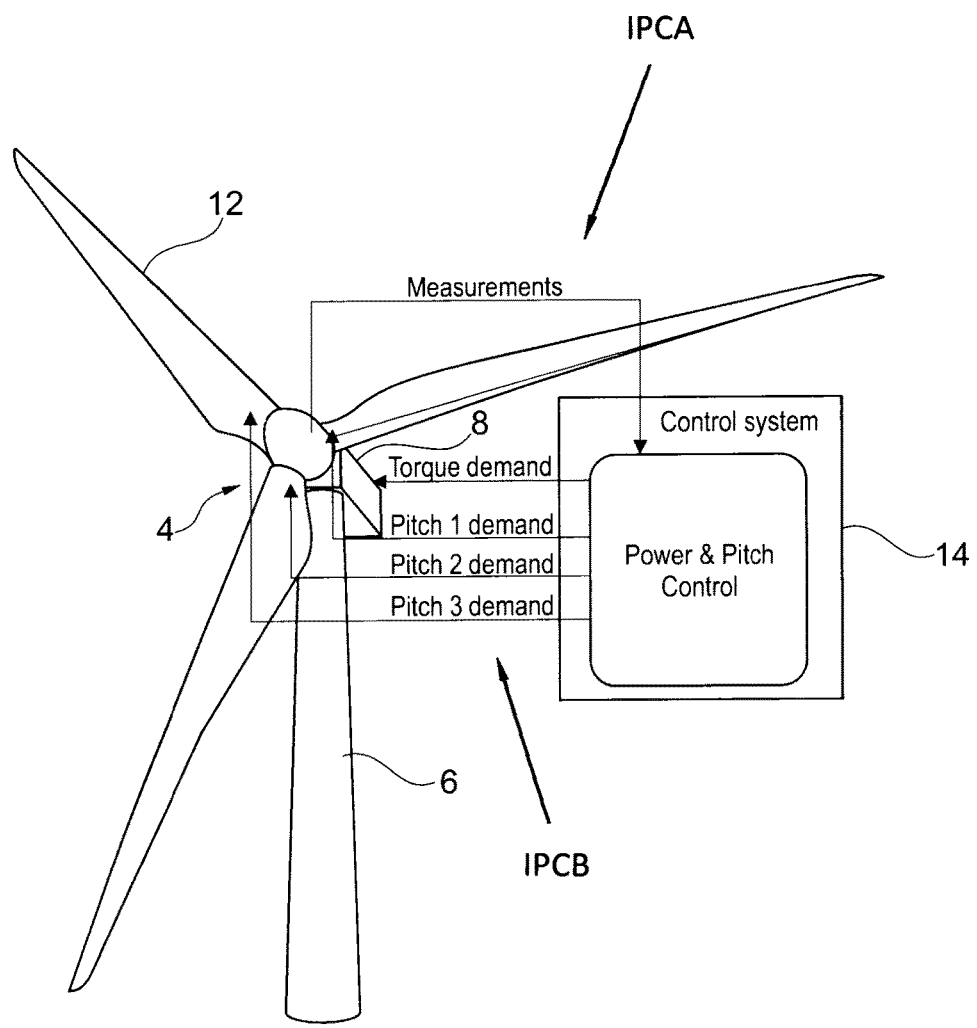
FIG. 2 shows a possible conceptual integration of IPC algorithms.

FIG. 2 shows a possible conceptual integration of IPC algorithms. The figure shows the integration point of the pitch offsets and thus the relevant signals. The two sets of vectors are named IPCA and IPCB for the two IPC algorithms.

Below there are described relevant concerns/challenges when superimposing the individual pitch references with a pitch offset. The integration concerns are of a general character for many IPC algorithms. It is preferred to avoid cross-coupling to collective pitch control (speed control).

A contribution to the pitch angle reference has the potential for disturbing collective pitch control (i.e. speed control). Other types of IPC algorithms, such as the existing cyclic pitch control, have guaranteed a mean=0 across the three blades at all times whereby the risk of disturbing the collective pitch control is reduced. The IPC is not designed to ensure that the mean=0 across the three blades, hence a disturbance of the speed control may be present. However, IPC is designed to react only to changes in blade load, i.e. not mean level whereby it is expected that the mean=0 for each blade over time. For the collective pitch control to be influenced by IPC, the external conditions must be such that all three blades are exposed to the same load change e.g. coherent gust which would cause the IPC for all blades to go positive. It is important to notice that the IPC will unload the blades in such a situation and thereby actually aid speed control.

The IPC is intended to co-exist with the existing cyclic pitch control. In short, the differences between the two algorithms is that cyclic pitch control attempts to minimize the nacelle tilt/yaw loads via cyclic pitch offset to the three blades, whereas the IPC attempts to minimize load variations in the local blade coordinate system by the previously described feed forward and feedback algorithms. There is nothing added specifically to the design of the IPC which eliminates unwanted interference between IPC and cyclic pitch control.

Another option for minimizing the risk of cross-coupling effects between the two controllers is to simply include a filter on the blade load measurement. The motivation for this is that loads are static tilt/yaw loads which are the scope of cyclic pitch control. However, such a solution is not included in the design as it introduces a phase delay in the response time of IPC for all frequencies within the range of which to react. Thereby the ability to handle extreme loads may be compromised.

Avoiding Stalling Resulting Pitch

The collective pitch control has some level of protection against driving the blade pitch into stall through minimum pitch constraint. The design of the IPC has some level of stall protection as it is not allowed to go below a minimum contribution, e.g. 0:5 deg. Again, the IPC reacts only to changes which eliminated a static operation in stall due to the IPC

The invention claimed is:

1. A method comprising:
providing a wind driven generator by independently controlling pitch of wind turbine generator blades, providing a tower,
providing an electric generator rotationally mounted atop the tower,
providing a rotor connected to the electric generator,
providing at least first, second and third wind driven blades rotationally connected to the rotor for changing pitch of the wind driven blades relative to the tower,
providing a control system,
providing a power and pitch control in the control system,
connecting the rotor to the power and pitch control,
connecting the generator to the power and pitch control,
connecting the first, second and third wind driven blades to the power and pitch control,
providing measurements of speed and thrust from the rotor to the power and pitch control,
providing measurements of individual rotational pitch position of the first, second and third wind driven blades from the rotor to the power and pitch control,
providing measurements of first, second and third individual wind loads from the rotor to the power and pitch control,
individually controlling pitch of a next blade according to actual measured load of a preceding blade,
providing a short delay before the individually controlling pitch of the next blade, and using the short delay for performing a precise and efficient adjusting of the controlling the pitch of the next blade.

2. The method of claim 1, further comprising using pitch demand from the preceding blade as well as the actual load of the preceding blade for individually controlling the pitch of the next blade.

3. The method of claim 1, further comprising providing a variable delay depending on rotor velocity before the individually controlling the pitch of the next blade.

4. The method of claim 1, further comprising providing a scaling factor to the individually controlling the pitch of the next blade.

5. A method comprising providing individually controlling pitch of rotor blades in a wind turbine generator by:
   providing a power and pitch control,
   inputting actual load level of each blade to the power and pitch control,
   inputting power production of the entire wind turbine generator power and pitch control,
   inputting rotor speed power and pitch control,
   regulating blade pitch of individual blades by power and pitch control based on load on a preceding blade in relation to angular velocity of the rotor,
   dynamically regulating pitch on a next blade,
   providing a short delay before the individually controlling pitch of the next blade, and using the short delay for performing a precise and efficient adjusting of the controlling the pitch of the next blade.

6. The method of claim 5, further comprising using pitch demand from the preceding blade as well as the actual load of the preceding blade for individually controlling the pitch of the next blade.

7. The method of claim 5, further comprising providing a variable delay depending on rotor velocity before the individually controlling the pitch of the next blade.

8. The method of claim 5, further comprising providing a scaling factor to the individually controlling the pitch of the next blade.

\* \* \* \* \*